(12) United States Patent
Chen et al.

(10) Patent No.: US 6,625,520 B1
(45) Date of Patent: Sep. 23, 2003

(54) SYSTEM AND METHOD FOR OPERATING ELECTRIC POWER SYSTEMS UTILIZING OPTIMAL POWER FLOW

(75) Inventors: Luonan Chen, 1-11-501, Honmachi, Nishinomiya-shi, Hyogo-ken (JP); Yasuyuki Tada, Kawasaki (JP); Hiroshi Okamoto, Tokyo (JP); Ryuya Tanabe, Tokyo (JP); Asako Ono, Tokyo (JP)

(73) Assignees: Luonan Chen, Nishinomiya (JP); The Tokyo Electric Power Company, Incorporated, Tokyo (JP)

( * ) Notice: Subject to any disclaimer, the term of this patent is extended or adjusted under 35 U.S.C. 154(b) by 571 days.

(21) Appl. No.: 09/583,573

(22) Filed: May 31, 2000

(51) Int. Cl.⁷ ................................................. H02P 9/00
(52) U.S. Cl. ...................... 700/286; 700/287; 700/297
(58) Field of Search ................................ 700/286, 287, 700/292, 293, 294, 295, 297, 298, 33; 703/2, 18; 361/111; 322/20

(56) References Cited

PUBLICATIONS de Tuglie et al. "A static optimization approach to assess dynamic available transfer capability" Jul. 1999, Power Industry Computer Applications, 1999, Proceedings of the 21ˢᵗ 1999 IEEE international Conference, pp. 269–277.*

Mark J. Laufenberg, et al., "A New Approach to Dynamic Security Assessment Using Trajectory Sensitivities," IEEE Transactions on Power Systems, vol. 13, No. 3, Aug. 1998, pp. 953–958.

M. LaScala, et al., "On–Line Dynamic Preventive Control: An Algorithm for Transient Security Dispatch," IEEE Transactions on Power Systems, vol. 13 No. 2, May 1998, pp. 601–610.

M. LaScala, et al., "A Tracking Time Domain Simulator for Real–Time Transient Stability Analysis," IEEE Transactions on Power Systems, vol. 13, No. 3, Aug. 1998, pp. 992–998.

Deqiang Gan, et al., "Stability–Constrained Optimal Power Flow," Proceedings of the Bulk Power Systems Dynamics and Control IV—Restructuring Symposium, Santorini, Greece, Aug. 1998.

* cited by examiner

*Primary Examiner*—Leo Picard
*Assistant Examiner*—Steven R. Garland
(74) *Attorney, Agent, or Firm*—Oblon, Spivak, McClelland, Maier & Neustadt, P.C.

(57) ABSTRACT

There is provided an available transfer capability calculating system for operating an electric power system, calculating optimal power flow with respect to assumption failure occurring in the electric power system and calculating available transfer capability of the electric power system based on the calculated value of the optimal power flow. The system has an optimal power flow calculating processor for deriving data associated with the initial phase angle and maximum electric power value of a generator by calculating mechanical output and electrical output of a generator including a generator phase angle defined by a time function in a condition that the generator phase angle does not exceed a preset value.

9 Claims, 10 Drawing Sheets

FUEL COST CHARACTERISTIC

| | α [CURRENCY UNIT/pu] | β [CURRENCY UNIT/pu] | γ [CURRENCY UNIT/pu] |
|---|---|---|---|
| GENERATOR1 | 0.0 | 4250 | 12068 |
| GENERATOR2 | 1.13 | 1304.5 | 18720.0 |

FIG. 14A

RESULT OF OPF CALCULATION (WITHOUT TRANSIENT STABILITY CONSTRAINT)

| FUEL COST | $\bar{P}_{g1}$ | $\bar{P}_{g2}$ | $\bar{V}_{g1}$ | $\bar{V}_{g1}$ | $\bar{V}_1$ | $\bar{V}_2$ | $\bar{V}_3$ | $\bar{V}_4$ |
|---|---|---|---|---|---|---|---|---|
| 34.162 | 0.25 | 1.769 | 1.0 | 1.071 | 1.010 | 1.011 | 1.0 | 1.0 |

(WITH TRANSIENT STABILITY CONSTRAINT)

| FUEL COST | $\bar{P}_{g1}$ | $\bar{P}_{g2}$ | $\bar{V}_{g1}$ | $\bar{V}_{g1}$ | $\bar{V}_1$ | $\bar{V}_2$ | $\bar{V}_3$ | $\bar{V}_4$ |
|---|---|---|---|---|---|---|---|---|
| 35.022 | 0.544 | 1.470 | 1.056 | 1.002 | 1.013 | 1.011 | 1.0 | 1.0 |

FIG. 14B

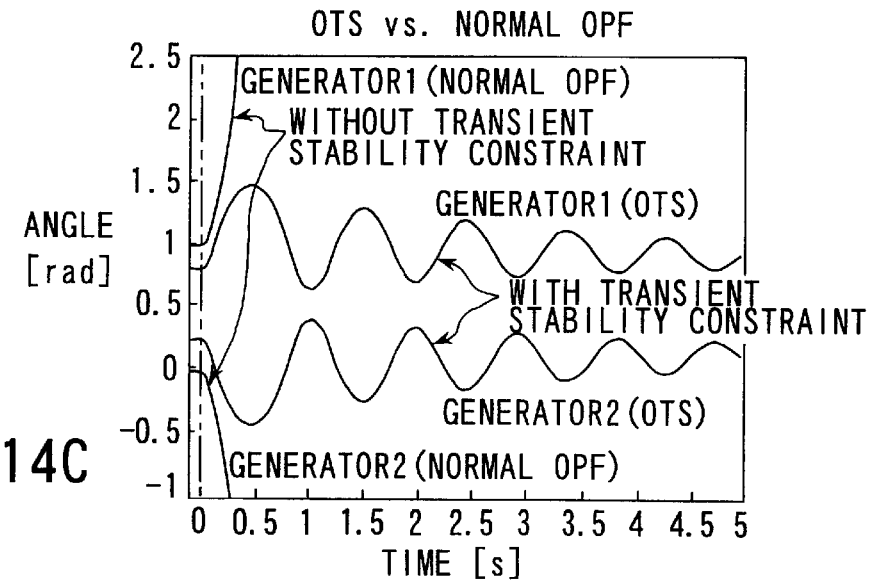

FIG. 14C

| CLEAR TIME OF FAILURE [sec.] | 0.06 | 0.08 | 0.10 | 0.12 | 0.14 |
|---|---|---|---|---|---|
| FUEL COST | 34.861 | 34.946 | 35.022 | 35.112 | 35.212 |

FIG. 14D

SYSTEM AND METHOD FOR OPERATING ELECTRIC POWER SYSTEMS UTILIZING OPTIMAL POWER FLOW

BACKGROUND OF THE INVENTION

This invention relates to a system and method for operating electric power systems and more particularly to a system and method utilizing optimal power flow (OPF) with transient stability constraints taken into consideration.

It is more strongly demanded than before to further enhance the operation efficiency of the electric power system and lower the operation cost due to drastic changes of environment for electric power industries in recent years, for example, deregulation or liberalization of electric power markets in Europe, Japan and United States of America. However, as is well known in the art, generally economics and stability have a trade-off relation for operation of power systems. In other words, if only the economical efficiency is considered in preference to other factors, the stability constraints may not be satisfied in the operation. If an operation solution which makes the operating cost (for example, fuel cost for turbine boilers) minimum can be determined by satisfying all of the operating conditions including the stability constraints of the system, it becomes possible not only to lower the operating cost but also to maintain the stability constraints.

In many deregulated electric power markets, e.g., in U.S.A., the evaluation of the available transfer capability (ATC) is mandatorily required, but dynamic constraints such as the transient stability constraints are still unable to be taken into consideration in ATC calculation due to theoretical and practical difficulties of computation. Therefore, it is imperatively required to rapidly develop a calculation method for ATC which takes the transient stability constraints into consideration in electric power industry. If a computational technique for OPF with the transient stability constraints can be developed, ATC with the transient stability constraints can be evaluated by solving a problem which maximizes transmission electric power between two points subject to transient stability constraints together with conventional operational constraints.

As mentioned above, ATC calculation is conventionally carried out mainly by taking only the static constraints (such as upper and lower bounds of power flow in the power transmission line or the like) of the electric power transmission network, but it is considered necessary to take the stability into consideration from the viewpoint of the security of the system. If ATC with the stability constraints taken into consideration can be calculated, then the above problem can be solved.

As one of the most important indices to evaluate the stability of the electric power system, the transient stability indicates the degree to which the stable synchronized operation of a synchronous generator can be maintained during and after the time of occurrence of disturbance in the power system. In practice, the practical power system is operated on the assumption that the transient stability is maintained even if a single equipment breaks down. Further, to protect the system from some rare cases of breakdowns such as cut-off of the route in the power transmission network, a system stabilizing relay for maintaining the transient stability of the whole system by tripping a pumping-up generator or limiting the power of a power supply has been put into practical use.

An optimal power flow method is conventionally proposed as a method for determining the optimal operation solution of the electric power system and is used for the planning and operation. However, it is considered difficult to take the transient stability into consideration in the optimal power flow calculation. Therefore, in principle, it is possible that an operation solution obtained by the conventional OPF without consideration of transient stability may not satisfy transient stability constraints.

In such a case, it is necessary for the system operator (or independent system operator) to make the adjustment of load dispatch again and modify the operation solution so as to satisfy the transient stability.

The modification process is traditionally implemented by heuristic trial-and-error methods based on engineering experience and judgment, which not only may sacrifice the optimality but also are time-consuming and not suitable for automated computation.

BRIEF SUMMARY OF THE INVENTION

An object of this invention is to provide a system and method for operating electric power systems and utilizing an optimal power flow calculating method with transient stability constraints incorporated therein.

In order to attain the above object, this invention provides an available transfer capability calculating system in the operation of an electric power system for calculating optimal power flow for assumption failures (or contingencies or accidents) occurring in the electric power system and deriving the available transfer capability of the electric power system based on the calculated value of the optimal power flow, comprising an optimal power flow calculating processor for deriving data relating to a maximum electric power value and an initial phase angle of a generator by calculating mechanical output and electrical output of the generator containing a generator phase angle defined by a time function in a condition that the generator phase angle does not exceed a preset value; a data collecting section for collecting system configuration data of the electric power system for effecting the calculation of the optimal power flow calculating processor; a data input section for inputting failure condition data and constraint data used for effecting the calculation of the optimal power flow calculating processor; and an output section for outputting data relating to the maximum electric power and phase angle of the generator derived by the optimal power flow calculating processor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 14A, 14B, 14C and 14D are diagrams showing one example of the calculation by the OPF processor of the fourth embodiment;

DETAILED DESCRIPTION OF THE INVENTION

There will now be described embodiments of this invention with reference to the accompanying drawings.

First Embodiment

An ATC calculating system utilizing an optimal power flow calculating method with the transient stability constraints taken into consideration is explained with reference to the accompanying drawings as a first embodiment of an operating system of an electric power system utilizing an optimal power flow calculating method according to this invention.

Figure 1:
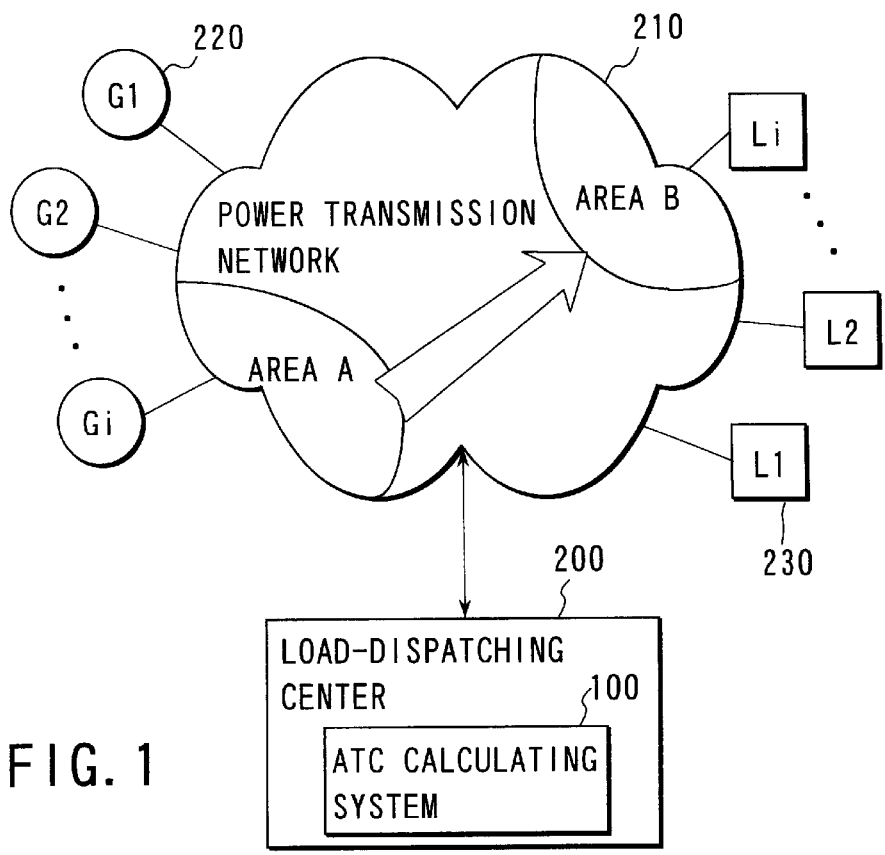
FIG. 1 is a diagram showing one example of an electric power system to which an ATC calculating system according to one embodiment of this invention is applied.

As shown in FIG. 1, an ATC calculating system 100 is installed in a load-dispatching office 200 of an electric power company. The load-dispatching office 200 collects data relating to necessary operating instructions and electrical quantities necessary for issuing the operating instructions for a power transmission network 210 to which at least a plurality of generators (in general, synchronous generators) 220 and loads 230 are connected.

Assume now that ATC calculation in a case where electric power is transmitted from the generator in an A region through the power transmission network to the load in a B region is made.

The detail of the ATC calculating system 100 is explained with reference to FIG. 2. The ATC calculating system 100 includes a data collecting section 110 for collecting various types of system configuration data items indicating the number of generators, capacities thereof, network characteristics, load characteristics and the like from the power transmission network 210 and transforming stations and control stations including the generators 220 (electric generating stations) and loads 230 (consumers) connected to the power transmission network 210, an OPF processor 120 which is described later in detail, an output section 130 for outputting an alarm and data including and relating to ATC calculated by the OPF processor 120, a data input section 140 for inputting data (failure condition data, constraint data) necessary for the OPF calculation in the OPF processor 120, and an operation scheduling section 150 for creating an operation scheduling based on data from the data input section 140.

The ATC calculating system 100 calculates OPF with respect to one or a plurality of assumption failures which may occur in either the power transmission network 210 or the generators 220 and obtains ATC and ATC thus obtained is notified to the operators or the like in the load-dispatching office 200 of the electric power company via the output section 130.

The OPF processor 120 can derive ATC by calculating OPF in a case where a plurality of assumption failures occur in the transmission system having a plurality of generators connected.

The calculation method of the OPF processor 120 is described below. First, in order to make it easy to understand the OPF processor 120, an example in which ATC is derived by calculating OPF when one assumption failure occurs in the transmission system of one-machine-infinite-bus system is explained.

Figure 3:
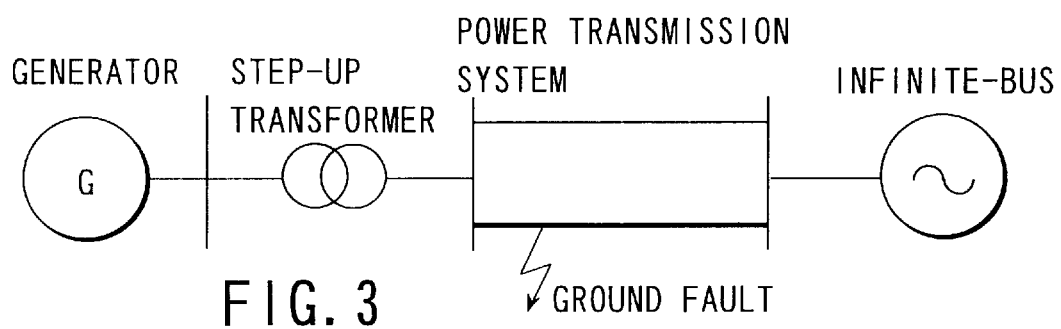
FIG. 3 is a diagram showing one model of the electric power system which has one generator and to which the ATC calculating method by the OPF processor of the above embodiment is applied.

FIG. 3 is a model of a power transmission system having one generator connected to the infinite-bus and it is assumed that a single circuit-three-phase ground fault occurs in the transmission line at time t=0 in the system and then the fault is cleared.

The process for calculating the maximum transmission power which satisfies the transient stability of the system with respect to the assumption failure is explained below. The thus calculated maximum transmission power is ATC.

Electric output P+jQ and mechanical input $P_m$ can be expressed as follows if $\delta$ indicates the phase angle of an internal bus of the generator (synchronous generator) and E indicates the magnitude of voltage of the internal bus.

$$P(\delta(t)) = \frac{EV}{X}\sin(\delta(t)) \quad (1)$$

$$Q(\delta(t)) = \frac{E^2 - EV\cos(\delta(t))}{X} \quad (2)$$

$$P_m(\delta(0)) = \frac{EV}{X}\sin(\delta(0)) \tag{3}$$

where X indicates an equivalent reactance in a range from the internal bus of the generator to the infinite-bus. Assume that the accident occurs at t=0. Then, during and after the occurrence of accident, X takes different values, due to structure changes of the system, e.g., $$X = \begin{cases} X_0; & t \leq 0 \quad \text{(before the accident)} \\ X_1; & 0 < t \leq t' \quad \text{(during the accident)} \\ X_2; & t' \leq t \quad \text{(after the accident)} \end{cases}$$

where t' clear time of the accident.

In the power transmission system before occurrence of the accident, the relation of $\delta(\mathbf{0})=\delta_0$ can be obtained in the equilibrium state.

After occurrence of the accident at t=0, the movement of internal phase angle $\delta$ of the generator and slip angular frequency $\omega$ of the rotor can be calculated by use of the following differential equations.

$$\dot{\delta}(t) = \omega(t) \tag{4}$$

$$\dot{\omega}(t) = \frac{\omega_0}{M}\left(P_m(\delta_0) - P(\delta(t)) - \frac{D}{\omega_0}\omega(t)\right) \tag{5}$$

$$\delta(\mathbf{0}) = \delta_0 \tag{6}$$

$$\omega(\mathbf{0}) = 0 \tag{7}$$

where V indicates m output voltage of the generator, $\omega_0$ indicates a reference angular frequency, M indicates an inertia constant of the generator, $P_m$ indicates electrical output, and D indicates a damping coefficient. Note that $P_m(\delta(\mathbf{0}))=P(\delta(\mathbf{0}))$.

In order to explain the feature of this invention, it is assumed that variables other than the internal phase angle of the generator are all kept constant. The problem for determining a state in which the transmission power is maximum with the transient stability set to the satisfied degree can be expressed as the following optimization problem.

$$\max P(\delta_0) \text{ for } \delta_0, \delta(t), \omega(t) \tag{8}$$

$$\text{s.t. } Q_{min} \leq Q(\delta_0) \leq Q_{max} \tag{9}$$

$$P_{min} \leq P(\delta_0) \leq P_{max} \tag{10}$$

$$\dot{\delta}(t) = \omega(t) \text{ with } \delta(0) = \delta_0 \tag{11}$$

$$\dot{\omega}(t) = \frac{\omega_0}{M}\left[P(\delta_0) - P(\delta(t)) - \frac{D}{\omega_0}\omega(t)\right] \text{ with } \omega(0) = 0 \tag{12}$$

$$\delta(t) \leq \delta_{max} \quad 0 \leq t \leq T \tag{13}$$

where the abbreviation "s.t." used above and hereinafter stands for "subject to."

The equation (13) expresses the transient stability constraint and indicates a condition that the phase angle $\delta$ of the generator will not become excessively large in a specified time period (T seconds) after the accident at t=0. If the phase angle $\delta$ of the generator becomes excessively large, the generator steps out. $P_{min}$, $P_{max}$, $Q_{min}$, $Q_{max}$ respectively indicate upper and lower limits of the output of the generator.

Since time t is a continuous value and equations (11)–(13) must hold at each time point from 0 to T, the optimization problem of equations (8)–(13) has infinite constraints and variable, which is generally difficult to solve by the conventional optimization techniques.

In the conventional case, the above optimization problem is approximately solved as a problem of finite dimension by using discrete time and converting the differential equation into a difference equation. More specifically, if a time period of T seconds from t=0 to t=T is expressed by a time series of time points t=0, $\delta t$, $2\Delta t$, ..., $N\Delta t$=T which are set at an interval of $\Delta t$ and the Euler method which is the simplest method for converting the differential equation into the difference equation is used, the above problem can be converted as follows.

$$\max P(\delta_0) \text{ for } \delta_0, \delta(\Delta t), \ldots, \delta(N\Delta t), \omega(N\Delta t) \ldots, \omega(N\Delta t) \tag{14}$$

$$\text{s.t. } Q_{min} \leq Q(\delta_0) \leq Q_{max} \tag{15}$$

$$P_{min} \leq P(\delta_0) \leq P_{max} \tag{16}$$

$$\delta(\mathbf{0}) = \delta_0 \tag{17}$$

$$\omega(\mathbf{0}) = 0 \tag{18}$$

$$\delta(\Delta t) = \delta(\mathbf{0}) + \omega(\mathbf{0})\Delta t \tag{19}$$

$$\omega(\Delta t) = \omega(0) + \frac{\omega_0}{M}\left(P(\delta_0) - P(\delta_0) - \frac{D}{\omega_0}\omega(0)\right)\Delta t \tag{20}$$

$$\delta(2\Delta t) = \delta(\Delta t) + \omega(\Delta t)\Delta t \tag{21}$$

$$\omega(2\Delta t) = \omega(\Delta t) + \frac{\omega_0}{M}\left(P(\delta_0) - P(\delta(\Delta t)) - \frac{D}{\omega}\omega(\Delta t)\right)\Delta t \ldots \tag{22}$$

$$\delta(N\Delta t) = \delta((N-1)\Delta t) + \omega((N-1)\Delta t)\Delta t \tag{23}$$

$$\omega(N\Delta t) = \omega((N-1)\Delta t) + \frac{\omega_0}{M}\left(P(\delta_0) - P(\delta((N-1)\Delta t)) - \frac{D}{\omega_0}\omega((N-1)\Delta t)\right)\Delta t \tag{24}$$

$$\delta(\mathbf{0}) \leq \delta_{max} \tag{25}$$

$$\delta(\Delta t) \leq \delta_{max} \tag{26}$$

$$\delta(N\Delta t) \leq \delta_{max} \tag{27}$$

In order to enhance the precision of conversion from the differential equation to the difference equation, it is necessary to set $\Delta t$ to a small value. In this case, the number (N+1) of time points of the time series to be considered becomes larger as the length of $\Delta t$ becomes shorter.

If N=1000 for T=10 seconds and $\Delta t$=0.01 second, the scale of the non-linear programming problem becomes as follows.

The number of variables is 1+2×1000=2001. That is, $\delta_0$, $(\Delta t)$, ..., $\delta(N\Delta t)$, $\omega(\Delta t)$, ..., $\omega(N\Delta t)$ are used as variables.

The number of equality constraints expressed by equations is 2×1000=2000. The number of inequality constraints expressed by inequalities is 5+1000=1005. If the number of assumption failures or the number of generators in the system is plural, the number of constraints becomes larger with an increase directly, proportional to the number of assumption failures or the number of generators. In a practical system there are generally 1000 buses and 100 generators or more, where the voltages of the respective buses and transformer taps will be treated as variables in addition to the phase angles of the generators and the stability constraints for the voltage and power flow are also taken into consideration besides equation (13). Therefore, the above approximate solution using the discretizing technique is difficult to be adopted in practice since the number of variables and the number of constraint conditions are extremely large.

This invention exploits the fact that the orbits of $\delta(t)$, $\omega(t)$ can be uniquely decided by use of the equations (11) and (12) if $\delta_0$ is determined.

To be more specific, the optimization problem with infinite dimensions expressed by the equations (8) to (13) can be replaced by a one-dimensional problem with a single variable $\delta_0$, and the transient stability constraints are replaced by a single constraint ($S(\delta_0)=0$).

As a result, a problem which will be an optimization problem with infinite dimensions in the conventional case can be replaced by an equivalent problem with finite dimensions.

Figure 4A:
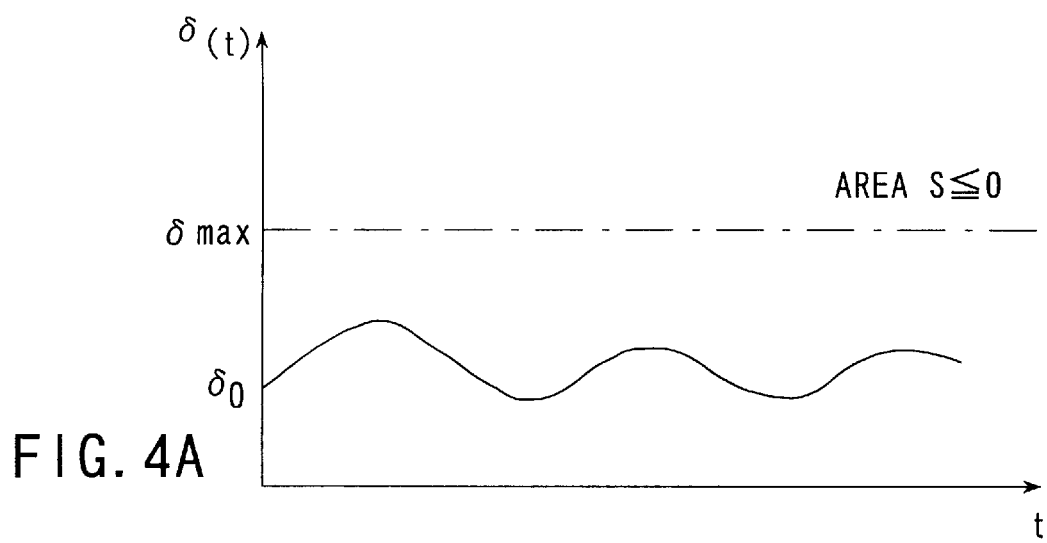
FIGS. 4A and 4B are diagrams for illustrating the OPF calculating method of this embodiment.
Figure 4B:
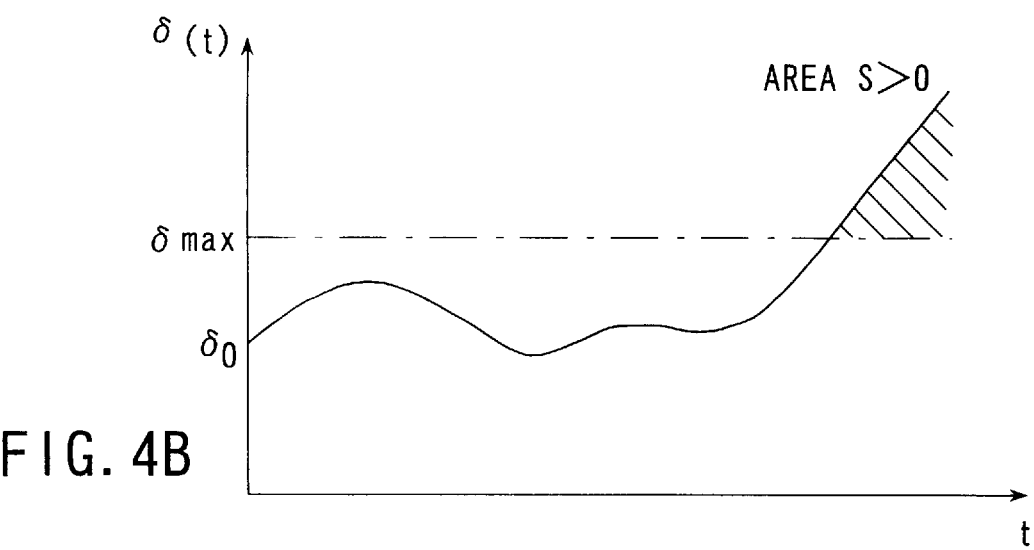

For example, as shown in FIG. 4B, in a case where the system becomes unstable after a fault, the accumulated value (area $S(\delta_0)$) in a region in which the phase angle of the generator violates the transient constraint $\delta_{max}$ of equation (13) becomes positive.

Further, as shown in FIG. 4A, in a case where $\delta(t) \leq \delta max$ at any time point and the system is transiently stable, the accumulated value $S(\delta_0)$ of constraint violation for equation (13) becomes 0.

Therefore, since it is only necessary to additionally consider only the condition of $S(\delta_0)=0$ when the transient stability constraints are taken into consideration, the optimization problem (8) to (13) for calculating the maximum transmission power can be expressed by an equivalent problem with one variable as shown by the following expressions.

$$\max P(\delta_0) \text{ for } \delta_0 \quad (28)$$

$$s.t. \ Q_{min} \leq Q(\delta_0) \leq Q_{max} \quad (29)$$

$$P_{min} \leq P(\delta_0) \leq P_{max} \quad (30)$$

$$S(\delta_0)=0 \quad (31)$$

In this case, however, usual procedures of non-linear optimization cannot be applied since $S(\delta_0)$ is non-differentiable with respect to $\delta_0$ at some points. Therefore, the condition of $S(\delta_0)=0$ is equivalently replaced by the following equation $h(\delta_0)=0$.

The following equation is used as one example. In fact, any differentiable function $h(\delta_0)$ satisfying $h(\delta_0)=0$ when $S(\delta_0)=0$ and $h(\delta_0) \geq 0$ can be used to replace equation (31).

$$h(\delta_0) = \int_0^T [\max\{0, \delta(t) - \delta_{max}\}]^2 dt = 0 \quad (32)$$

where h is the square of violation amount of the constraints. Further to satisfy constraint qualification, equation (32) can be approximately expressed as $h(\delta_0) \leq e$ by introducing a small positive constant e. $\delta(t)$ in the equation (32) is calculated by use of the equations (11) and (12). Jacobian in the equation (32) is determined as follows.

$$\frac{\partial h}{\partial \delta_0} = 2 \int_0^T \max\{0, \delta(t) - \delta_{max}\} \frac{\partial \delta(t)}{\partial \delta_0} dt \quad (33)$$

In the above equation, $\partial \delta(t)/\partial \delta_0$ can be derived from the following linear differential equation.

$$\frac{d}{dt} \begin{bmatrix} \frac{\partial \delta(t)}{\partial \delta_0} \\ \frac{\partial \omega(t)}{\partial \delta_0} \end{bmatrix} = \begin{bmatrix} 0 & 1 \\ \frac{dP(\delta(t))}{d\delta(t)} & -D/M \end{bmatrix} \begin{bmatrix} \frac{\partial \delta(t)}{\partial \delta_0} \\ \frac{\partial \omega(t)}{\partial \delta_0} \end{bmatrix} + \begin{bmatrix} 0 \\ \frac{dP(\delta_0)}{d\delta_0} \end{bmatrix} \quad (34)$$

As a result, the non-linear optimization problem with infinite dimensions is converted into an optimization problem with one variable, and the scale of the problem to be solved becomes extremely small in comparison with that of the existing methods and thereby it can be easily calculated.

Specifically, the number of variables is one, that is, only $\delta_0$ is used as a variable.

The number of equality constraint is one, that is, only the equation (32) is used as the above constraint.

Further, the number of inequality constraints is four, that is, the right and left terms of the inequality (9) and the right and left terms of the inequality (10) are used as the above constraint.

Since the Jacobian matrix of the equation (32) can be calculated by use of the equations (33) and (34), the equations (28) to (30) and the equation (32) of the converted optimization problem can be calculated by use of the conventional optimization methods, for example, Quasi-Newton method or sequential QP (Quadratic Programming) method.

Figure 5:
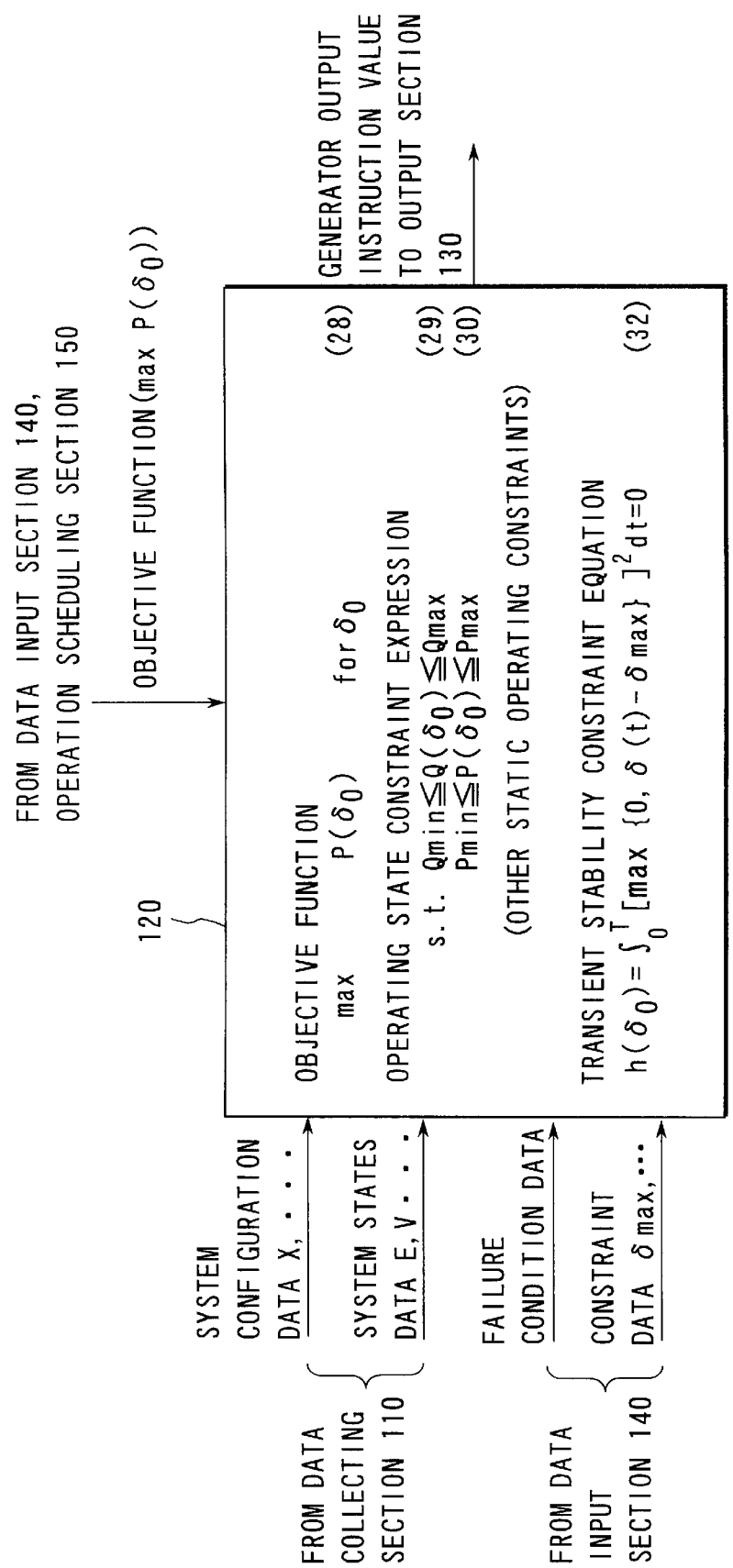
FIG. 5 is a block diagram showing the OPF processor of the above embodiment in detail.

FIG. 5 shows the OPF processor 120 constructed according to the above optimization method.

As shown in FIG. 5, system configuration data such as data X supplied via the data collecting section 110, system states data such as data E, V, and failure condition data and constraint data supplied via the data input section 140 are input to the OPF processor 120. The OPF processor 120 receiving the above data items solves the equations (28)–(30), (32) to obtain the optimal initial value $\delta_0$ of $\delta(t)$ and maximal P. The initial value $\delta_0$ can be supplied to the control section of a corresponding generator via the output section as a generator instruction and maximal P is used for power operation of its own company via the output section as ATC or used for presenting ATC to another company at the time of wheeling.

Figure 6:
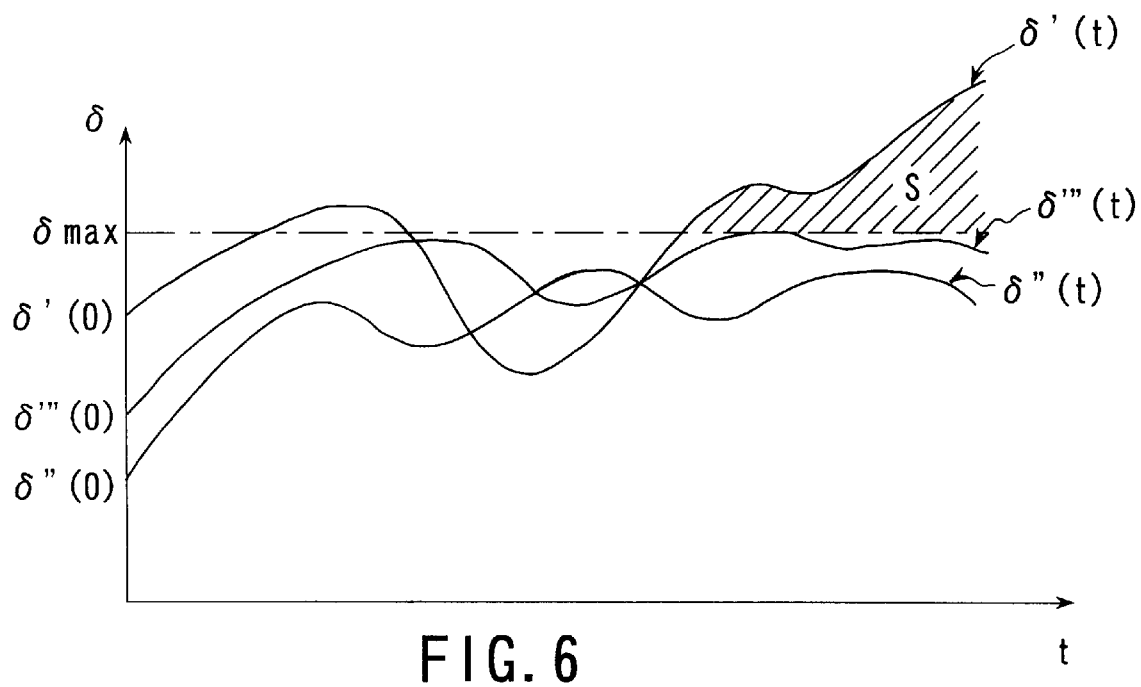
FIG. 6 is a diagram for illustrating the calculating method by the OPF processor of the above embodiment.

FIG. 6 shows $\delta(t)$ obtained when various system configuration data, failure condition data and constraint data are input to the OPF processor 120. In this example, $\delta'(t)$ indicates an unstable case wherein $S(\delta_0)>0$. $\delta''(t)$ indicates a stable case wherein $S(\delta_0)=0$ but transmission power P is not maximum. $\delta'''(t)$ indicates a stable case wherein $S(\delta_0)=0$ and transmission power is maximum.

Figures 7A, 7B:
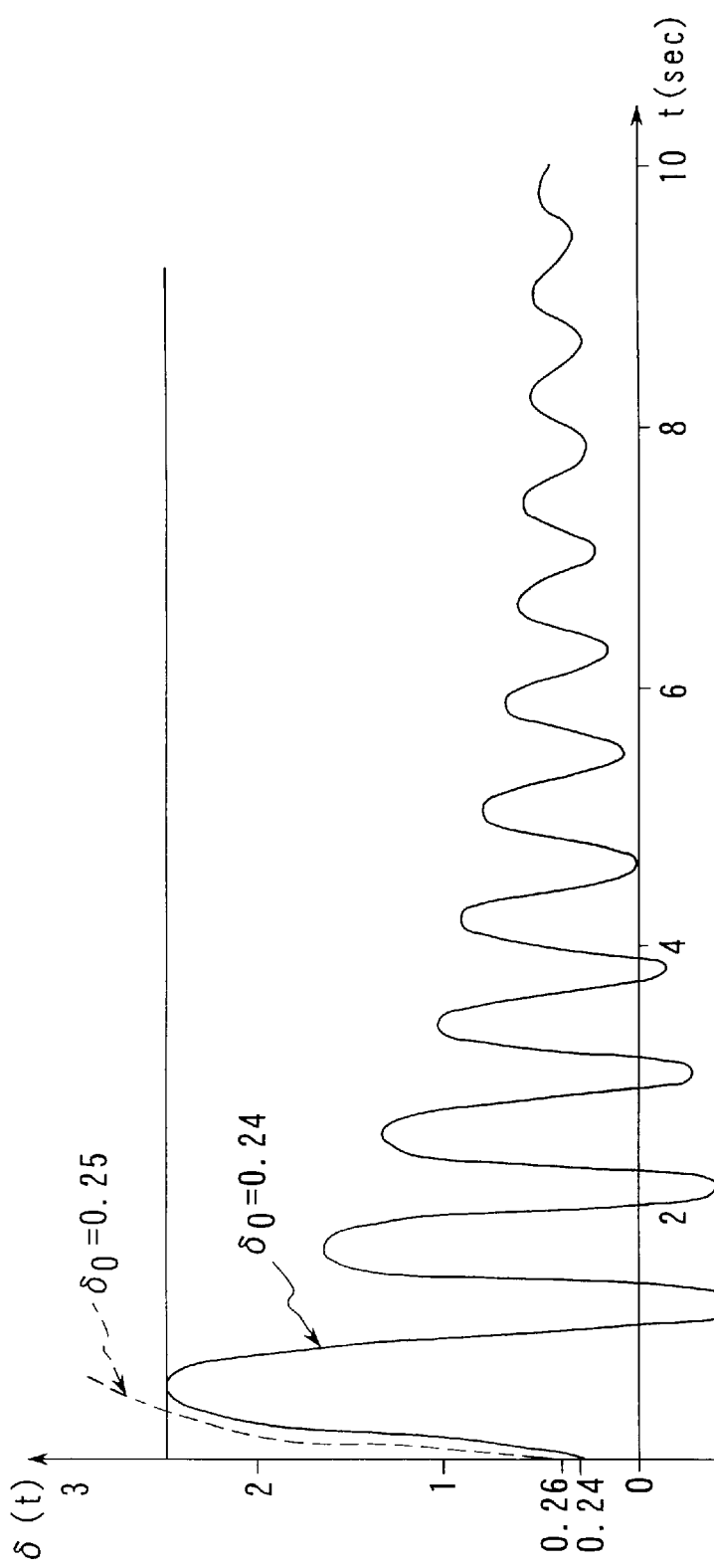
FIGS. 7A and 7B are diagrams showing one example of the calculation by the OPF processor of the above embodiment.

In this case, the initial value $\delta_0$ of $\delta(t)$ in the case of $\delta'''(t)$ is the optimal solution and maximal P is ATC. Next, a concrete calculation example is explained with reference to FIGS. 7A and 7B. The result is calculated for the model system of FIG. 3 by the present method, which satisfies the transient stability, as shown in FIGS. 7A and 7B. In this case, the calculation is made by setting M=second, $\omega_0$=314, $P_{min}$=0 pu, $P_{max}$=2 pu, $Q_{min}$=−2 pu, $Q_{max}$=2 pu, $\delta max$=2.5 rad and assuming that the study period T is 10 seconds. FIG. 7A indicates a locus of solution when the clear time of the accident is t'=0.3 second. The solid line indicates the optimum solution with $\delta_0$=0.24 and the broken lines optimal the unstable solution with $\delta_0$=0.25.

$\delta_0=0.24$ rad (13.7 degrees) is obtained by the present method. If the value is slightly increased, e.g., $\delta_0$ is set to 0.25 rad (14.3 degrees), the generator steps out after occurrence of the assumption failure as shown in FIG. 7A, thereby proving that the solution obtained by the present method is an optimal solution.

The result of calculations by variously changing data items is shown in FIG. 7B. The Quasi-Newton method is used for optimization.

In the embodiment of the OPF processor 120, OPF in the electric power system having one generator connected to the infinite-bus is calculated. If it is applied to a multi-generator system, the variables in the equations (28) to (30) and equation (32) are converted into a vector form. Therefore, OPF and ATC in the multi-generator system can be calculated in the same way as the above example.

The calculation method for ATC in the power transmission network of a multi-generator system is described below. In order to make it easy to understand the operation of the OPF processor 120, a case wherein ATC is derived when electric power is transmitted from a specified generator to a specified load in the power transmission network with two generators is explained.

Figure 8:
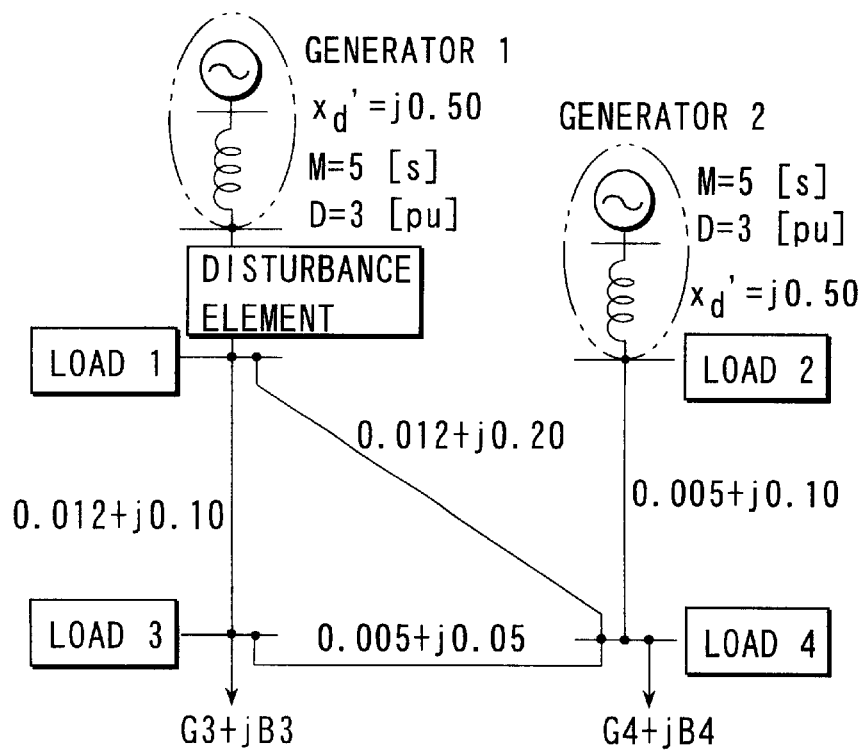
FIG. 8 is a diagram showing one model of the electric power system which has two generators and to which the ATC calculating method by the OPF processor of the above embodiment is applied.

FIG. 8 is a model of a power transmission system in which two generators 1, 2 and loads (L) 3, 4 are connected to one power transmission network. In the above system, calculation of ATC when electric power is transmitted from the generator 2 to the load 3 is described below. In this case, as the severest assumption failure in the system, failure in the power transmission end of the generator 1 is considered. Assume that the failure occurs at t=0 and is cleared at t=t'. Then the structure of the system, i.e., $\dot{Y}_{ij}$ in equation (39) undergoes three phases changes, i.e., before the failure, during the failure and after the failure as the same way as X of equations (2)–(3).

The OPF processor 120 for calculating ATC is only required to solve the optimization problem expressed by the following expressions.

$$\max G_3 \tag{35}$$

$$s.t. \; Q_{min} \leq Q \leq Q_{max} \tag{36}$$

$$P_{min} \leq P \leq P_{max} \tag{37}$$

$$h_i = \int_0^T \max\{0, \; |\delta_i(t) - \delta_c(t)| - \delta_{max}\}^2 dt = 0, \; i = 1, 2 \tag{38}$$

$$P_i + Q_i = \sum_{j=1}^{4} \dot{Y}_{ij} * \dot{V}_i * \dot{V}_i \quad i = 1, 2, \ldots, 4 \tag{39}$$

$$V_{min} \leq V \leq V_{max} \tag{40}$$

where 3 indicates the number in this example of the load to which electric power is transmitted by wheeling, and $G_3$ indicates active power consumption of the load 3. Further, 4 denotes the number of buses in the power transmission network.

In this example, the objective function to be maximized is the active power $G_3$ of the load 3 and the constraints (36), (37) correspond to those obtained by converting the variables in the inequalities (9), (10) described in the embodiment into the vector form.

The transient stability constraints (38) for two generators correspond to that of the equation (32) by considering the number (in this example, 2) of generators. In this case, $\delta_i(t)$ indicates the internal phase angle of the generator i and $\delta_c(t)$ indicates the phase angle of the inertia center defined by the following equation. The above optimization problem is calculated for a specified assumption failure.

$$\delta_c(t) = \frac{\sum_{i=1}^{2} M_i \delta_i(t)}{\sum_{i=1}^{2} M_i} \tag{41}$$

where $M_i$ denotes the inertia constant of the generator i.

That is, the condition expressed by the equation (38) indicates that a difference $|\delta_i(t)-\delta_c(t)|$ between the internal phase angle of each generator and the phase angle of the inertia center does not exceed $\delta_{max}$ during period [0, T].

The constraints (39) indicate the relation to be satisfied by the active/reactive power flow in the power transmission network and are called a power flow equations. In this case, $\dot{Y}_{ij}$ indicates an (i,j) element in the admittance matrix of the power transmission network. Further, in a symbol *$\dot{V}$, $\dot{V}$ indicates a vector in the AC circuit theory and * indicates a complex conjugate.

The constraint (40) assures that the voltage of each bus in the power transmission network is set within a constant permissible range. In addition, the constraints which can be taken into consideration in normal OPF, for example, the upper limits of power flow in each power transmission route can be considered in the same manner as that described above if required.

Figure 9:
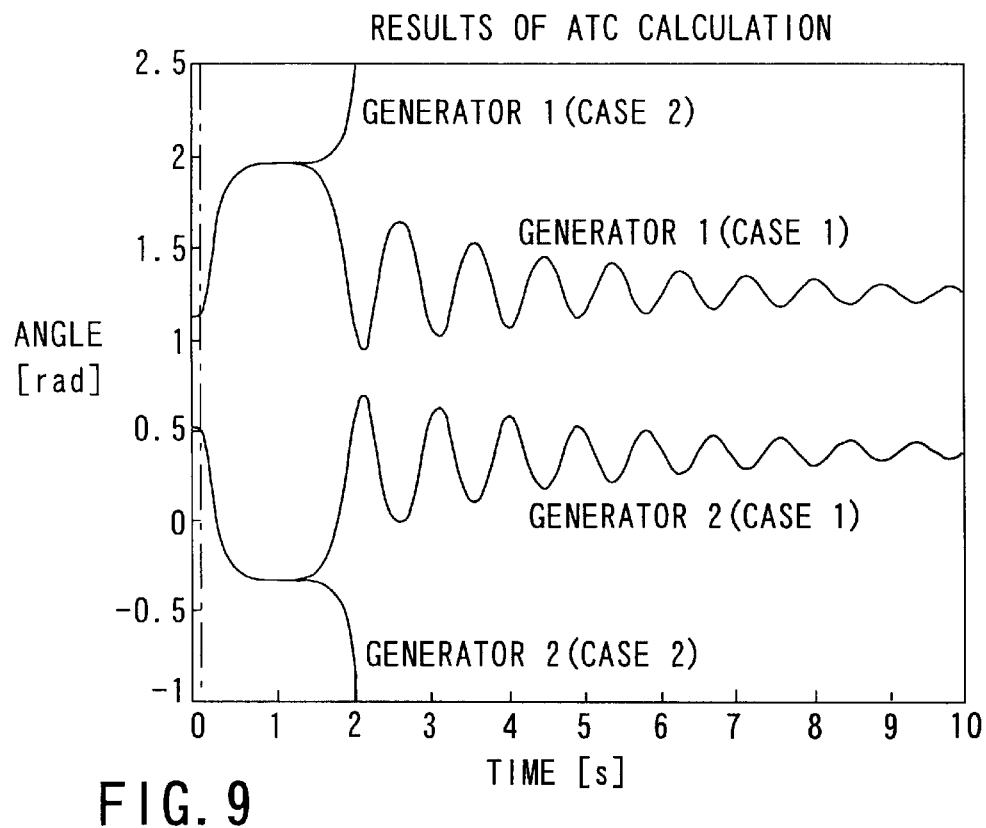
FIG. 9 is a diagram showing one example of the calculating method in an electric power system having a plurality of generators by the OPF processor of the above embodiment.

For the optimization of equations (35)–(40), the active power output of the generator 1 was fixed. This is attained by setting the upper limit and lower limit equal to each other. ATC actually calculated by the present method in the system of FIG. 8 was 1.82 pu. FIG. 9 shows the results of calculation for the internal phase angles of the generators 1, 2 for the assumption failure by simulation. Clearly, the transient stability can be maintained, when generator 2 transfers the same active power as ATC obtained by the present method to load 3 (case 1). However, when the power transmission amount is increased by 0.0001 pu with respect to ATC (case 2), the transient stability cannot be maintained and the generator steps out. That is, according to the present method, ATC which is obtained by additionally taking the transient stability into consideration can be accurately calculated in the power transmission network of multi-generator system.

Thus, the calculation method for ATC in a multi-generator system is basically obtained by expanding the ATC calculation method in a one-machine-infinite-bus system. Even if three or more generators are used, ATC can be calculated in exactly the same manner as in the above example. In this case, the number of equations corresponding to the transient stability constraint equation (38) is simply increased with an increase in the number of generators. Besides, the constraints for voltage values or other variables can also be taken into consideration during the period [0, T] as the same way as the angles of generators in equations (38).

Figure 10:
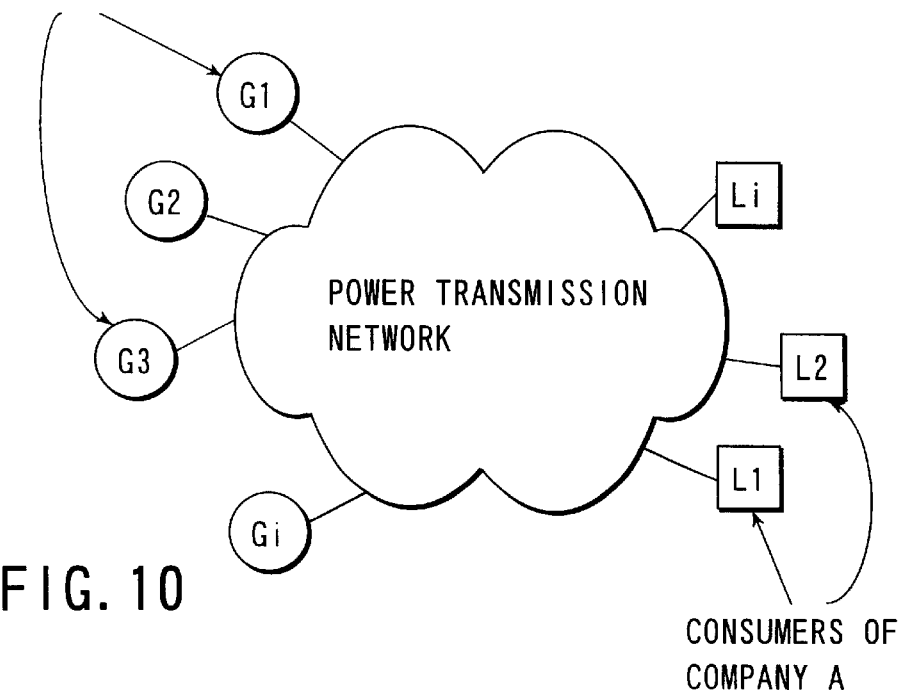
FIG. 10 is a diagram showing one example of the electric power system to which a calculating system for deriving TTC by the OPF processor of the above embodiment is applied.

Further, in a case where the available transfer capability (which may be called TTC (Total Transfer Capacity) so as to be distinguished from normal ATC) from a power generating company having a plurality of generators to a consumer having a plurality of loads as shown in FIG. 10 is calculated, the calculation can be carried out by converting the objective function (35) to the total sum of the loads of the consumer.

Second Embodiment

In the first embodiment described above, a case wherein OPF is calculated under the condition that the constraint violation does not occur during all of the time period [0, T] is explained, but if it is sometime desired to make evaluation under the condition that the constraint violation does not occur only in a specified time period [$t_1$, $t_2$], the evaluation may be made by converting the equation (38) to the following equation (42).

$$h(\delta_0) = \int_{t_1}^{t_2} [\max(0, \delta(t) - \delta_{\max})]^2 dt = 0 \tag{42}$$

Further, if it is desired to make evaluation under the condition that constraint violation does not occur at specified time $t_1$, the evaluation may be made by converting the equation (38) to the following equation (43).

$$h(\delta_0) = [\max(0, \delta(t_1) - \delta_{max})]^2 = 0 \tag{43}$$

The above condition can be applied to a case where $\delta(t)$ is a monotone increasing function or a case where $\delta(t)$ is an oscillation divergent function which can be determined according to failure condition data.

For example, FIGS. 6 and 7A show a case wherein $\delta(t)$ is an oscillation divergent function, but if $\delta(t)$ is a monotone increasing function, the initial value $\delta_0$ of $\delta(t)$ and maximal P are obtained when the initial value $\delta_0$ of $\delta(t)$ is set such that $\delta(t)$ does not exceed a preset value $\delta_{max}$.

Figure 11:
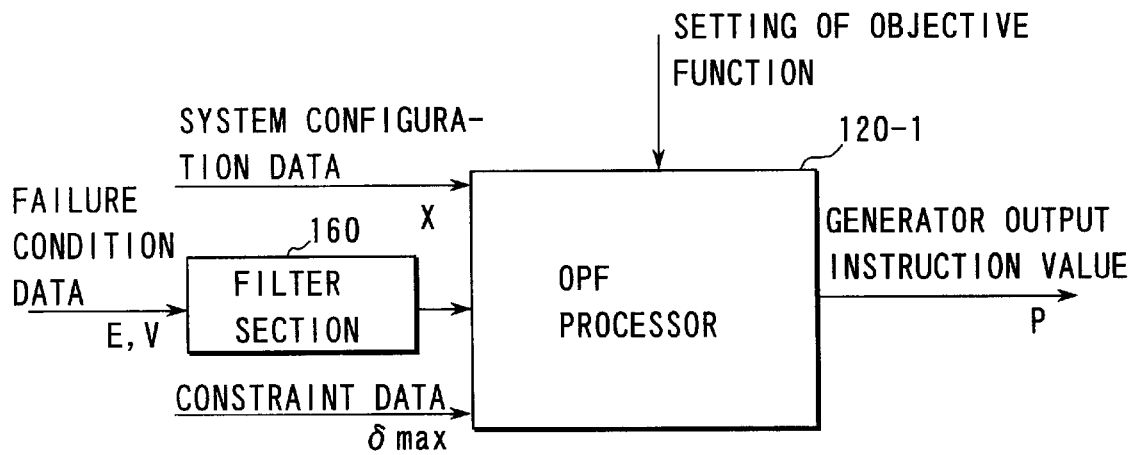
FIG. 11 is a block diagram showing an OPF processor of a second embodiment.

FIG. 11 shows an OPF processor 120-1 for making the OPF calculation by use of the above method in which failure condition data is selected by a filter section 160 by use of an EIGEN-value analysis or the like for determining whether or not the system after elimination of the failure is oscillation-divergent, using the method shown in FIGS. 6 and 7A in a case of an accident in which $\delta(t)$ is an oscillation divergent function and making the calculations expressed by the equations (42), or (43) in a case of an accident in which $\delta(t)$ is a monotone increasing function.

Third Embodiment

The above-described OPF processors 120, 121-1 are used to obtain ATC by calculating OPF in the power transmission network of one-generator or multi-generator system by taking a specified assumption failure into consideration. However, in the power transmission network of multi-generator system, since it is necessary to deal with a large number of assumption failure candidates if it is not previously known what one of the assumption failures is important for the safe operation of the system, the number of transient stability constraints becomes large, the amount of calculations becomes large due to simultaneous consideration of all contingencies such that the calculation is not practical.

On the other hand, despite a large number of contingencies, most of them do not violate the transient stability constraints. That is, most of constraints are automatically satisfied and only a few stability constraints have an effect upon the operation solution. Therefore, the inventors of this application thought out a method for calculating ATC in the multi-generator system while reducing the amount of calculations as much as possible by use of failure screening methods (fast screening techniques), such as an energy function method disclosed in U.S. Pat. No. 5,719,787 (On-line Contingency Screening of Electric Power Systems) by H. D. Chiang, C. Wang, time domain method or equal-area criterion method.

Figure 2:
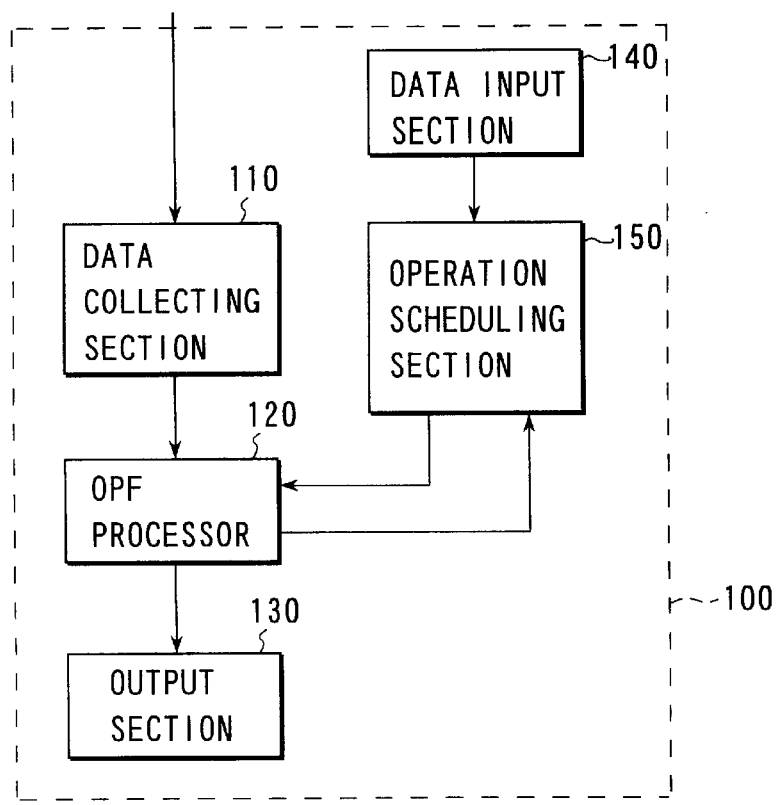
FIG. 2 is a detail block diagram showing the ATC calculating system of the above embodiment.
Figure 12:
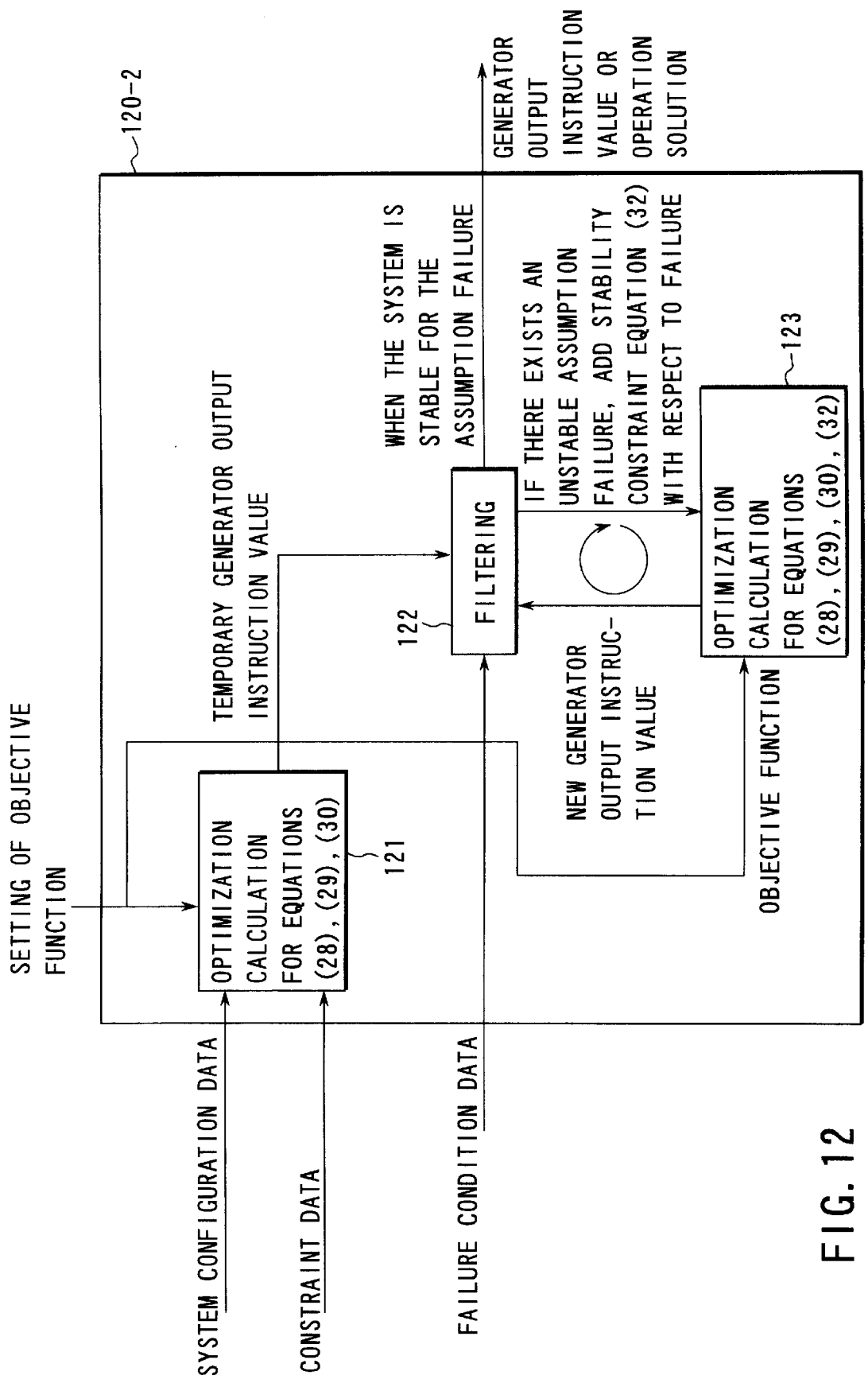
FIG. 12 is a block diagram showing an OPF processor of a third embodiment.

The above ATC calculating system makes an OPF calculation by subjecting only the failures which have influence on the transient stability among the original assumption failures by the screening process and it can be attained by replacing the OPF processor 120 in the ATC calculating system shown in FIG. 2 by an OPF processor 120-2 shown in FIG. 12. That is, in FIG. 12, the OPF processor 120-2 includes a calculating section 121 for calculating the equations (28) to (30), a failure filtering section 122 based on any fast screening method, and a calculating section 123 (which is substantially the same as the OPF processor 120) for calculating the equations (28)–(30), (32).

The OPF processor 120-2 shown in FIG. 12 first calculates the equations (28) to (30) which are obtained by omitting the equation (32) from the equations (28)–(30), (32) of the OPF processor 120 based on system configuration data and constraint data by use of the calculating section 121 to obtain a temporary generator output instruction value. Then, the filtering section 122 filters only unstable assumption failures among all of assumption failures according to a fast screening method, adds the equation (32), causes the calculating section 123 to calculate the equations (28)–(30), (32) and obtains new generator output instruction values. By repeatedly carrying out the calculations in the filtering section 122 and calculating section 123, OPF and ATC in the multi-generator system are calculated.

Fourth Embodiment

In the above embodiments, ATC with transient stability constraints is obtained by setting a objective function of OPF as the transmission power in the multi-generator power system. In this case, only by changing the objective function of the OPF processor, calculations for economic load dispatch control (ELD) can be carried out.

Figure 13:
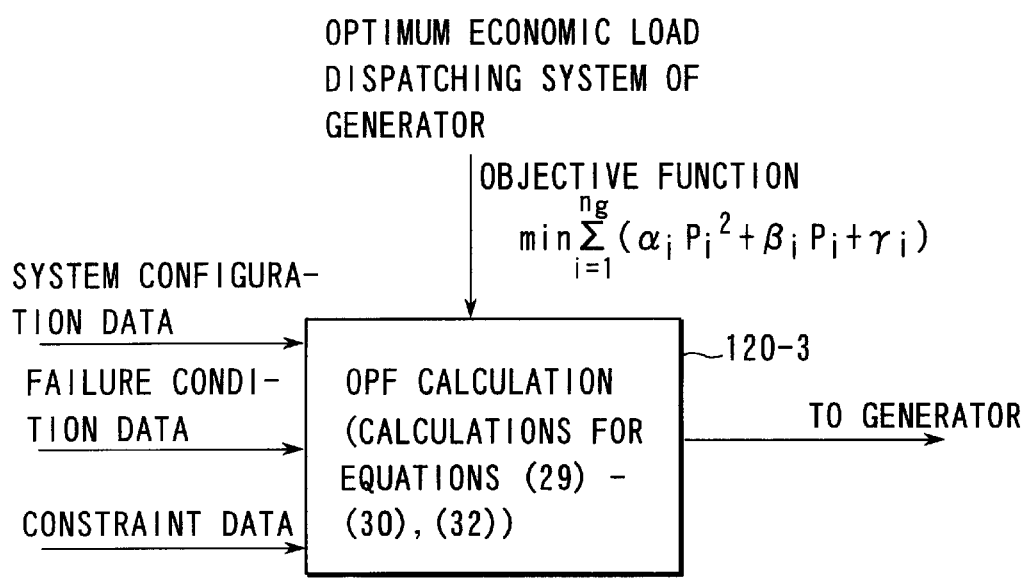
FIG. 13 is a block diagram showing an optimal economic dispatching system of a generator according to this invention using an OPF processor of a fourth embodiment.

FIG. 13 shows an optimum economic load dispatching system constructed by taking the transient stability into consideration.

In order to maintain the frequency in the electric power system, the output of the generator is changed according to the demand of the consumer and, in order to minimize the fuel cost of the turbine boiler associated with the generator, an ELD control operation is effected in the power supply station to determine the output of the generator. However, if only the economical efficiency is considered in preference to other factors of the system operation, the transient stability may not be maintained when an accident occurs in the electric power system. This is because the transient stability cannot be taken into consideration when the fuel cost is lowered to minimum in OPF used in the present ELD control operation.

If the transient stability constraint equation is added to the present ELD control calculation logic by use of the method of this invention, it becomes possible to minimize the fuel cost while markedly reducing the possibility of unexpected power failure with the computation time kept substantially constant.

In the system shown in FIG. 13, the objective function in an OPF processor 120-3 is set as a function for minimizing the total sum of fuel costs for each unit time in the generators in the system expressed by the following equation in the same manner as in normal ELD.

$$\min \sum_{i=1}^{n_g} (\alpha_i P_i^2 + \beta_i P_i + \gamma_i) \tag{44}$$

where $\alpha_i$, $\beta_i$, $\gamma_i$ are constants determined by the fuel cost characteristic for each generator and $P_i$ is the active output of the generator i. In this case, i indicates an individual generator and $n_g$ indicates the number of generators.

The ELD control calculation with the transient stability can be effected by use of the present method by taking a case wherein the two generators of FIG. 8 are connected to the power transmission network as an example. In this case, the ELD calculation is carried out while the active power of the loads 3, 4 is set at 1 pu. FIG. 14A shows the fuel cost characteristic used for calculation and FIG. 14B shows the results of ELD control calculations with and without the transient stability constraint (38). Further, 14C shows the results of calculations for dynamics of the internal phase angle of the generator with respect to the assumption failure when the above respective ELD control operations are effected. As shown in FIG. 14B, the fuel cost obtained in normal ELD without the transient stability constraint is lower than in a case with the transient stability constraint.

However, as shown in FIG. 14C, when the system is operated by the ELD control operation without the transient stability constraint and if assumption failure occurs, the system becomes unstable. The operating state of the generator which can satisfactorily attain both of the transient stability and the economical efficiency by use of ELD according to this invention can be easily calculated. Time required for the calculation is only approximately one second when using a personal computer and it is also practical and efficient for the calculation in a large-scale system.

FIG. 14D shows the result of ELD calculation carried out while changing the clear time of the assumption failure. The minimum fuel cost with the transient stability constraint tends to increase with the clear time of failure, which is identical to the experience of the operator.

According to the embodiment described above, the operation of the power flow of the system which is conventionally effected according to the experience of the system operator can be effected based on a quantitative index by placing the system for calculating ATC and OPF in the power supply station for operating the electric power system.

In this case, in the power supply station, ATC and ELD are accurately calculated, and if the actual power flow exceeds ATC, it is informed to the operator via the output section 130 by an alarm, and at the same time, ATC and optimal generator output are indicated so that the operator can adequately adjustify the system operation and prevent the power system from instability even when an accident occurs. Further, the adequacy of the system operation scheduling and planning can be evaluated at higher speed and more accurately than in the conventional case from the viewpoint of ATC by inputting data associated with the assumption power of the consumers in the near future via the output section 140.

The above embodiments are examples of the system for applying the OPF calculation by the OPF processors 120, 120-1, 120-2 to the ATC and ELD calculations and it becomes possible to markedly reduce the number of constraints related to the transient stability for the optimal power flow (OPF) and easily add the dynamic characteristic of the system to determine a static state of optimum operating state.

Figure 16:
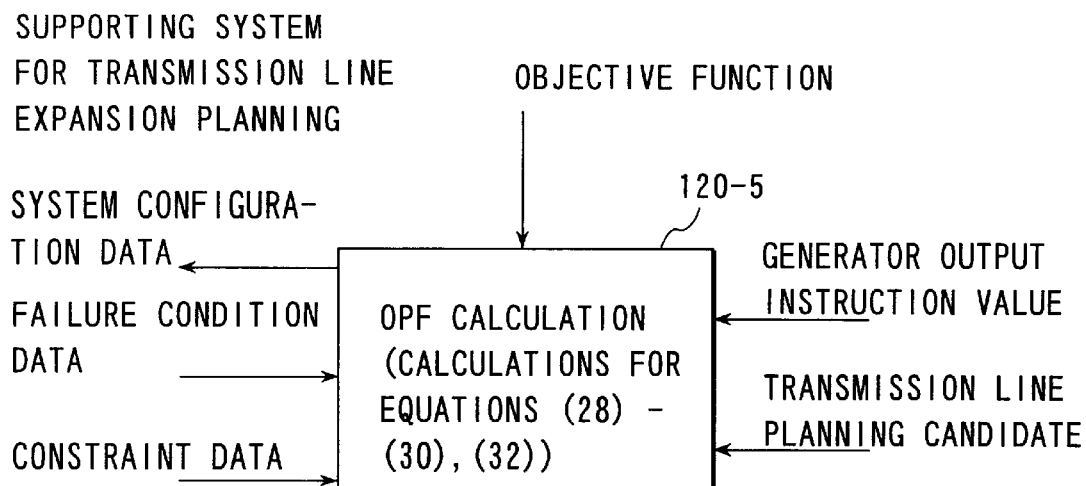
FIG. 16 is a block diagram showing a supporting system of transmission line expansion planning according to this invention using an OPF processor.
Figure 17:
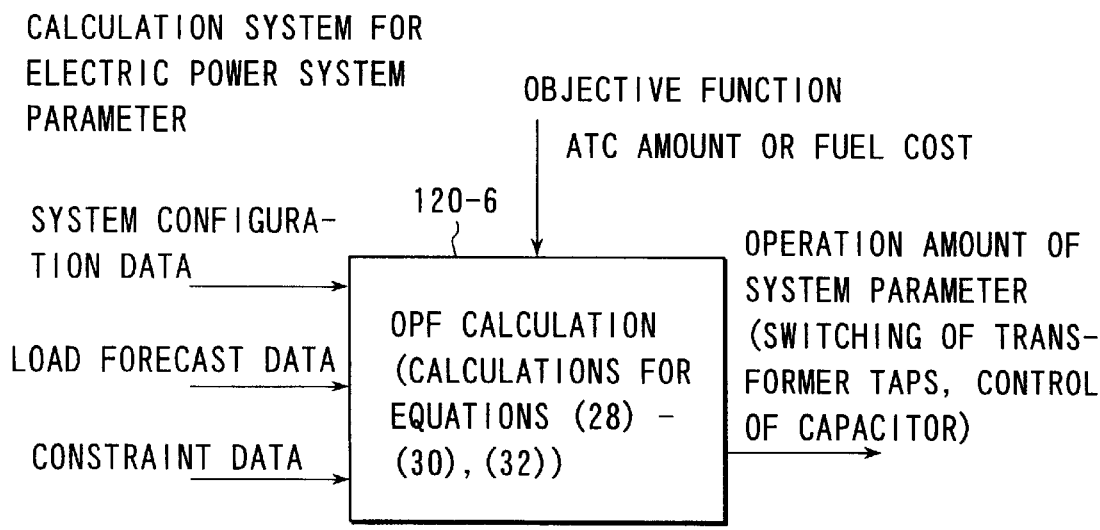
FIG. 17 is a block diagram showing a calculating system for electric power system parameters according to this invention using an OPF processor.

The optimal power flow calculation is a calculation technique for minimizing or maximizing the objective function according to the request of the system operator (or independent system operator). Therefore, available transfer power can be attained by using the objective function as the transfer power and carrying out the calculation for maximizing the objective function. Further, when the optimal load dispatch is calculated, it can be attained by using the objective function as the fuel cost and carrying out the calculation for minimizing the objective function. Thus, the optimal power flow calculation can be easily applied to a system which will be described later and is shown in FIGS. 15 to 17 by changing the objective function in the optimal power flow calculation.

Figure 15:
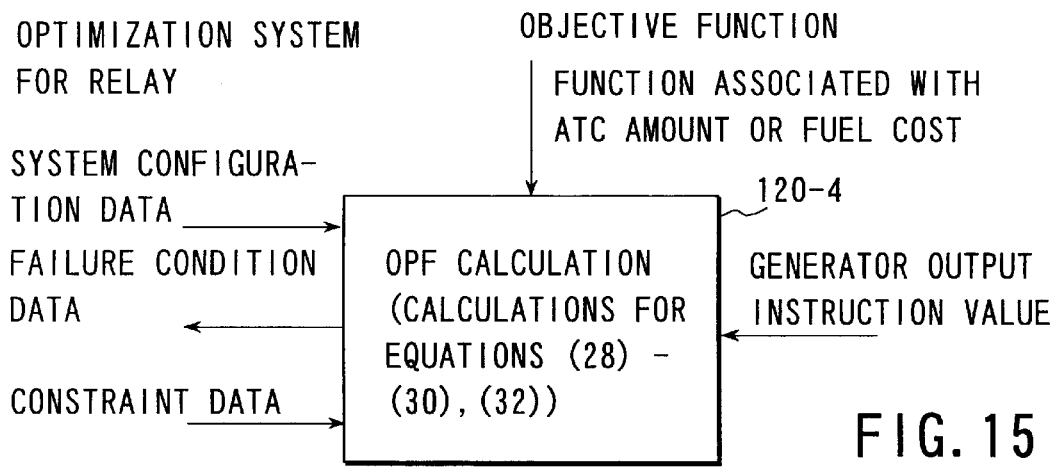
FIG. 15 is a block diagram showing an optimization system for relay of the electric power system according to this invention using an OPF processor.

FIG. 15 shows an optimization design system of relay for maintaining the transient stability.

As a protection device for maintaining the function of the system with minimum damage even if the transient stability cannot be maintained, a transient stability maintaining protection system is used in many systems. In order to determine the protection operation, a large number of simulations are calculated and an adequate protection operation is manually tuned.

If this invention is applied to the above operation, labor for studying can be greatly saved, an adequate protection operation amount can be unconditionally determined by calculations, and therefore, the precision can be markedly enhanced.

If the protection operation amount is dealt with as an operation variable in a concrete application method, the function of the system can be easily maintained by reducing the protection operation amount to minimum. With further improvement of capability for computers, a protection operation amount determining logic can be incorporated into the system so that the protection operation amount can be determined online. In this case, the objective function of an OPF processor 120-4 of FIG. 15 is set to a function for defining the ATC amount or a function associated with the fuel cost shown in FIG. 13. The protection operation amount can be obtained as failure condition data of the OPF processor 120-4.

FIG. 16 shows a supporting system of transmission line expansion planning.

When a power station is constructed, it is necessary to adequately design the transmission line for transmitting electric power generated. An expansion plan for the transmission line is made by taking various uncertain factors into consideration. At present, a large number of simulations must be carried out for evaluation of the transient stability. However, by applying this invention, labor required for the expansion planning can be markedly reduced. In this case, the objective function of an OPF processor 120-5 of FIG. 16 is set to a function for defining the ATC amount or a function associated with the fuel cost shown in FIG. 13. In the OPF processor 120-5, the generator output instruction value and transmission line expansion candidate are supplied to the OPF processor 120-5 as input data and an expansion plan of the transmission line can be made by use of output system configuration data.

FIG. 17 shows an optimization design system for parameter control of an electric power system such as a voltage control device. A consumption amount of the electric power system is changing every hour and it is the duty of the electric power company to supply a voltage and frequency within a specified range according to a change in the consumption amount. As is explained so far, as to the frequency, it is possible to determine the stable and economical operation state by solving an OPF problem with fuel cost minimization as the objective function subject to transient stability constraints. Further, the method of this invention can also be applied to the design of a voltage control device for maintaining the voltage within a preset range, even for transient period of an accident.

Evaluation of the performance of the present voltage control device is made from a large number of simulations by repeatedly solving the power flow problem according to a change in the consumption amount, adjusting a large number of parameters so that the magnitude of a voltage will not step out from the constraint range in any time period during changes in the consumption amount. On the other hand, an ideal voltage control free from the constraint violation at any time of a considered period can be effected by treating the dynamic behavior of the voltage as an area of the constraint violation (as same way as the angle of FIG. 6) by use of the voltage control device of this invention. Therefore, the voltage control device can be easily designed.

In this case, the calculation for minimizing the control amount can result in reduction of equipment investment, thereby greatly contributing to optimization of expansion planning for equipments.

In this case, the objective function of an OPF processor 120-6 of FIG. 17 is set as the ATC or a function associated with the fuel cost shown in FIG. 13. The OPF processor 120-6 receives system configuration data, load forecast data and constraint data to make the OPF calculation with a specified objective function. As a result, operation amounts of system parameters associated with switching of transformer taps and capacitor control are output from the OPF processor 120-6.

As described above, according to this invention, the operating system of the electric power system can be attained by utilizing the optimal power flow calculation constrained by the transient stability.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An available transfer capability calculating system for operation of an electric power system providing generators, network load, voltage, current and frequency for calculating optimal power flow with respect to assumption failure occurring-in the electric power system and calculating available transfer capability of the electric power system based on the calculated value of the optimal power flow, comprising:

an optimal power flow calculating processor for calculating mechanical output and electrical output of a generator containing a generator phase angle defined by a time function under a condition that the generator phase angle does not exceed a preset value to derive data associated with an initial phase angle and maximum electric power value of the generator;

a data collecting section for collecting system configuration data of the electric power system used for making the calculation of said optimal power flow calculating processor;

a data input section for inputting failure condition data and constraint data used for making the calculation of said optimal power flow calculating processor; and an output section for outputting data associated with the phase angle and maximum electric power value of the generator obtained by said optimal power flow calculating processor.

2. The available transfer capability calculating system according to claim 1, wherein said optimal power flow calculating processor derives an initial value $\delta_0$ of $\delta(t)$ and maximum of P when the initial value $\delta_0$ of $\delta(t)$ is satisfied by solving the following expressions based on system configuration data associated with the generators, network and loads of the electric power system and input from said data collecting section, system state data associated with the voltage, current and frequency of the electric power system, failure condition data associates with failure which is assumed to occur on the electric power system, constraint data associated with conditions to be satisfied by the electric power system and input from said data input section, and a objective function input from said data input section, supplies the initial value $\delta_0$ to a corresponding one of the generators as a generator instruction via said output section and shows maximum of P as the available transfer capability:

defining:

$$P(\delta(t)) = \frac{EV}{x}\sin(\delta(t))$$

$$Q(\delta(t)) = \frac{E^2 - EV\cos(\delta(t))}{x}$$

$$P_m(\delta(0)) = \frac{EV}{x}\sin(\delta(0))$$

$$\dot{\delta}(t) = \omega(t)$$

$$\dot{\omega}(t) = \frac{\omega_0}{M}\left(P_m(\delta_0) - \left(P(\delta(t)) - \frac{D}{\omega_0}\omega(t)\right)\right)$$

$$\delta(0) = \delta_0$$

$$\omega(0) = 0$$

then $$\max P(\delta_0) \text{ for } \delta_0$$

$$s.t. \ Q_{min} \leq Q(\delta_0) \leq Q_{max}$$

$$P_{min} \leq P(\delta_0) \leq P_{max}$$

$$h(\delta_0) = \int_0^T [\max\{0, \delta(t) - \delta_{max}\}]^2 \, dt = 0$$

where t indicates time,

V indicates an output voltage of the generator, $\omega_c$ indicates a reference angular frequency, $\delta$ indicates an internal phase angle, E indicates a voltage of an internal bus, P+jQ indicates electric output of a generator, $P_m$ indicates mechanical input of the generator, X indicates an equivalent reactance in a range from an internal bus of the generator to an infinite-bus, and takes different values before, during and after the occurrence of accident, $$x = \begin{cases} x_0; & t \leq 0 \quad \text{(before the accident)} \\ x_1; & 0 < t \leq t' \quad \text{(during the accident)} \\ x_2; & t' \leq t \quad \text{(after the accident)} \end{cases}$$

t' indicates clear time of the accident,

ω indicates angular frequency of a rotor of the generator,

M indicates an inertia constant of the generator,

D indicates a damping coefficient, $P_{max}$, $Q_{max}$ indicate upper limits of the output of a generator, $P_{min}$, $Q_{min}$ indicate lower limits of the output of generator, h indicates a stability evaluation function, and T indicates consideration time.

3. The available transfer capability calculating system according to claim 1, wherein said optimal power flow calculating processor further includes a filter section for determining a kind of assumption failure and selecting the failure condition data and constraint data input to said optimal power flow calculating processor based on the determination.

4. The available transfer capability calculating system according to any one of claims 1 to 3, wherein said optimal power flow calculating processor includes means for deriving an initial value of a rotor phase angle and available transfer capability of the generator when an accumulated value in an area in which the phase angle of the generator violates the constraints is zero.

5. The available transfer capability calculating system according to claim 1, wherein said optimal power flow calculating processor includes means for deriving an initial value of a rotor phase angle and available transfer capability of the generator when the rotor phase angle does not exceed a preset value at preset time.

6. The available transfer capability calculating system according to claim 1, wherein said optimal power flow calculating processor includes means for calculating an equation obtained by modeling a case where one of the generators is connected to an infinite-bus and at least one assumption failure occurs in the electric power system.

7. The available transfer capability calculating system according to claim 1, wherein said optimal power flow calculating processor includes means for calculating an equation obtained by modeling a case where a plurality of generators are connected to a power transmission network and at least one assumption failure occurs in the electric power system.

8. An available transfer capability calculating method comprising the steps of:

inputting system configuration data of a electric power system, failure condition data occurring in the electric power system and constraint data associated with the electric power system and setting up a objective function; and calculating mechanical output and electrical output of a generator of the electric power system indicated by a rotor phase angle function using time as a variable according to the input data and objective function;

wherein the objective function is determined in a condition that the rotor phase angle function does not exceed a preset value in the available transfer capability calculating method for calculating an available transfer capability value of the electric power system based on the calculated mechanical output and electrical output obtained in said calculating step.

9. A method for calculating economic load dispatch of a generator by using the method described in claim 8 while the objective function is determined in one of a condition that the rotor phase angle function does not exceed the preset value and a fuel cost of a turbine boiler associated with the generator is minimized.

* * * * *